[11] 3,602,570

| [72] | Inventor | David L. Greenaway |
| | | Untereichen, Birchwil, Switzerland |
| [21] | Appl. No. | 763,213 |
| [22] | Filed | Sept. 27, 1968 |
| [45] | Patented | Aug. 31, 1971 |
| [73] | Assignee | RCA Corporation |
| [32] | Priority | June 20, 1968, June 20, 1968, Sept. 10, 1968 |
| [33] | | Great Britain |
| [31] | | 29580/68, 29581/68 and 43055/68 |

[54] APPARATUS FOR MAKING ANNULAR HOLOGRAMS
4 Claims, 10 Drawing Figs.

[52] U.S. Cl. ............................................. 350/3.5, 350/162
[51] Int. Cl. ........................................... G02b 27/00
[50] Field of Search .................................. 350/3.5

[56] References Cited
UNITED STATES PATENTS
| 2,770,166 | 11/1956 | Gabor | 350/3.5 |
| 2,982,176 | 5/1961 | Kay | 350/3.5 |
| 3,526,505 | 9/1970 | Kroemer | 350/3.5 |

OTHER REFERENCES
Stroke et al., British Jour. of Applied Physics, Vol. 17, No. 4, April, 1966, pp 497–500 plus plates at end of issue (and noted in article) [350/3.5]

*Primary Examiner*—David Schonberg
*Assistant Examiner*—Ronald J. Stern
*Attorney*—Edward J. Norton ABSTRACT: An "annular" hologram is produced by the interference between at least a portion of a reference beam of coherent light confined to a circular annular region symmetrically disposed about a given axis and an information component obtained from an object symmetrically disposed with respect to the given axis which is illuminated by the coherent light. The object, which is usually a transparency, is confined within an interior region which is surrounded by the reference beam. All the principal elements utilized to make an "annular" hologram have circular symmetry with respect to the given axis. This results in optimized resolution, fidelity, and alignment facility.

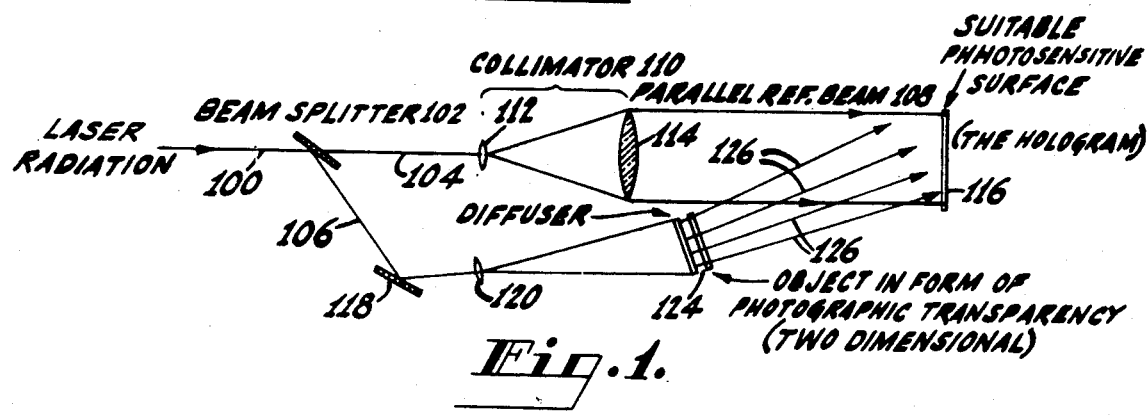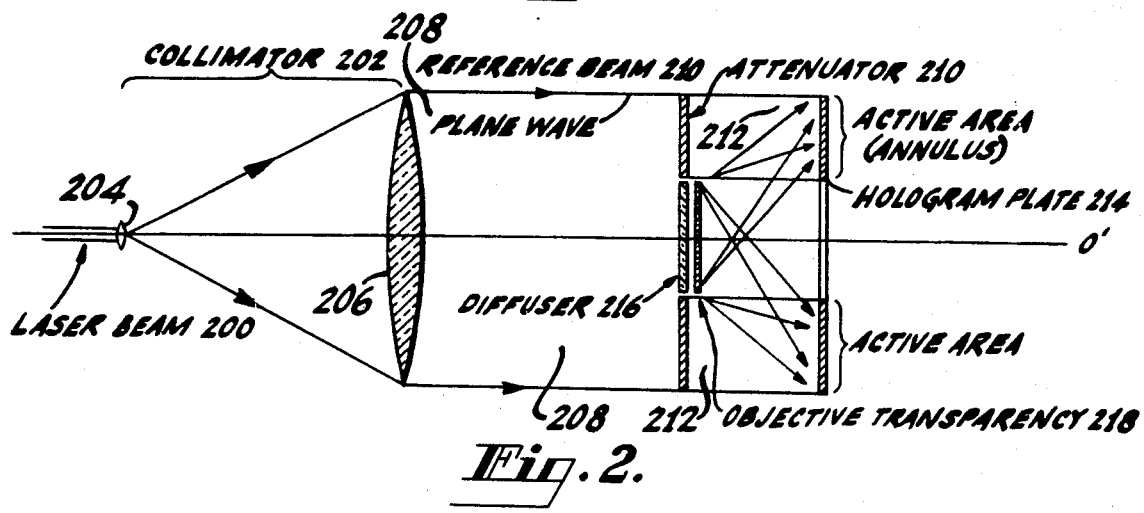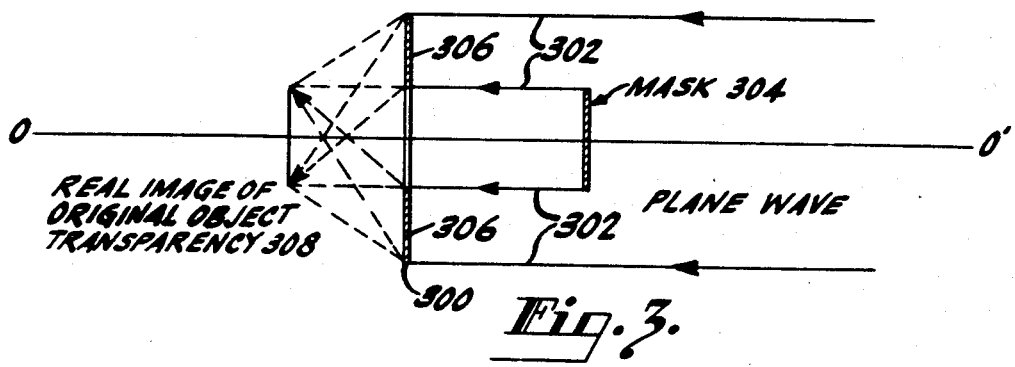

INVENTOR
DAVID L. GREENAWAY

INVENTOR
DAVID L. GREENAWAY

BY George J. Seligsohn
ATTORNEY

INVENTOR
DAVID L. GREENAWAY
BY George J Seligsohn
ATTORNEY

APPARATUS FOR MAKING ANNULAR HOLOGRAMS

This invention relates to methods and apparatus for making and reproducing holograms and, more particularly, to such methods and apparatus for making and reproducing "annular" holograms.

A hologram is a recording of the information in a wave front of light obtained from an object, which may be a three-dimensional object or may be a two-dimensional transparency, which is illuminated with spatially coherent monochromatic light. More specifically, as described in detail in the article, "Photography by Laser," by Emmett N. Leith and Juris Upatnieks, appearing on page 24 of the June 1965 issue of Scientific American, a hologram consists of the recording of the fringes formed by the interference between a reference component of light, obtained directly from a spatially coherent monochromatic light source, and an information component of light, obtained from the object to be recorded when illuminated by light from the light source. The reference component is directed to a surface area of the recording medium at a predetermined angle which, at least in part, is different from the angle at which the information component is directed at the surface area of the recording medium. This recorded interference pattern is called a hologram.

A replica of the information component wave front may be reconstructed by illuminating a hologram with a source of spatially coherent monochromatic light. This results from the hologram diffracting the light impinging thereon to form two sets of first-order diffracted waves each of which is a replica of the waves that issued from the original object. One of these two sets, when projected back to the illuminating source produces a virtual image of the original object, while the other of these two sets produces a real image of the object without the use of a lens.

The degree of fidelity with which the original object information may be transferred to the reconstructed image by means of a hologram depends on the type of wave fronts used for both the reference beam utilized in making the hologram and the reconstruction beam utilized in reproducing the hologram. If both these wave fronts are composed of radiation of the same frequency and are either accurately plane or if the convergence of the reference beam is matched by the proper divergence of the reconstruction beam, then the reproduction takes place with no distortion, and with neither magnification nor reduction in size. The resolution which can theoretically be achieved with holograms depends both on the size of the hologram and the solid angle of the information component obtained from the object which interferes with the reference beam at the hologram recording plate, and ultimately on the wavelength of the radiation being utilized.

In prior art methods and apparatus for making and reproducing holograms, such as described in the above identified article by Leith et al. it is extremely difficult to optimize the fidelity of the hologram and simultaneously obtain a resolution in the reproduction of the hologram which approaches the wavelength of the radiation being utilized.

For certain applications, such as in the production of integrated circuits, it is required that multipally repeated two-dimensional complex patterns contained in a high resolution mask be transferred faithfully onto the surface of the integrated circuit medium in a form suitable for the subsequent processing of the integrated circuits. Such a transfer of information is normally effected by contact printing the mask pattern onto a suitable photosensitive surface which has previously been applied to the surface of the integrated circuit medium. Such contact printing of the masked pattern results in many problems which would be obviated if holographic methods could be utilized to transfer the necessary information by light projection, rather than contact printing, with the required extreme degree of fidelity and resolution.

The present invention is directed to methods and apparatus by which both the fidelity and resolution of a reproduced hologram can be optimized, and in addition introduces a number of simplifications into the optical system, as compared with the prior art methods and apparatus disclosed in the above-identified Leith et al. article.

The holograms produced by the methods and apparatus of the present invention are termed "annular" holograms. This name is used to differentiate these holograms from those produced by prior art methods and systems. The reason for utilizing the term "annular" is because holograms made in accordance with the methods and apparatus of the present invention are configured in the form of an annulus or a sector thereof.

It is therefore an object of the present invention to make and reproduce holograms that are inherently capable of superior fidelity and resolution.

In accordance with certain features of the present invention, the centers of the object and hologram plate both lie on the axis of the reference beam; the plane of the object which is taken to be two-dimensional, and the plane of the photosensitive surface of the hologram plate lie normal to the axis of the reference beam, and a single collimated beam of radiation may provide both the reference beam and the object illuminating beam.

These, and other objects, features and advantages of the present invention, will become more apparent from the detailed description taken together with the accompanying drawing, in which:

FIG. 1 is an illustrative embodiment of the prior art apparatus utilized for recording a hologram;

FIG. 2 is a first illustrative embodiment of the present invention, which is utilized for recording an "annular" hologram;

FIG. 3 is a second illustrative embodiment of the present invention, which is utilized for reconstructing an "annular" hologram;

Figure 4:
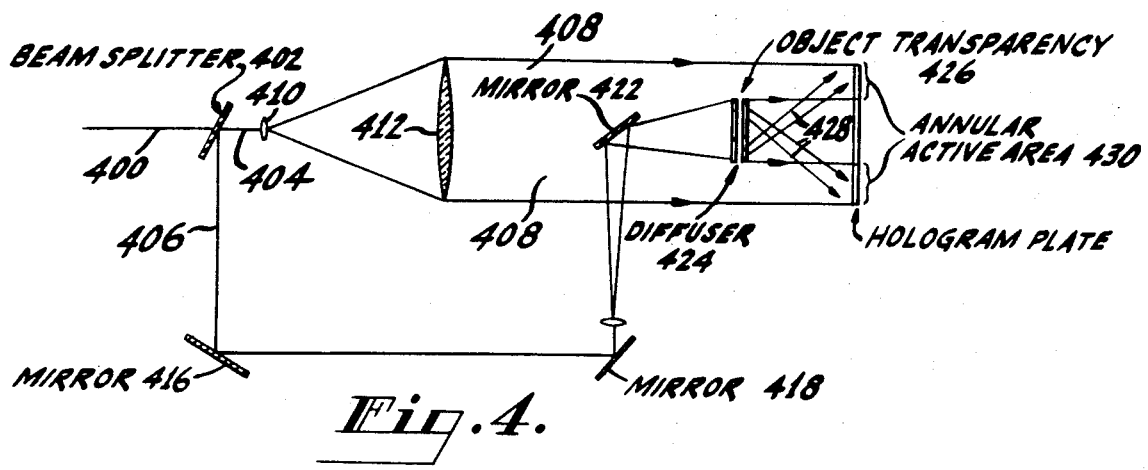
FIG. 4 is a third illustrative embodiment of the present invention, which is utilized for recording an "annular" hologram.

Referring now to FIG. 1, there is shown the conventional prior art apparatus for recording a hologram. In particular, beam 100 of spatially coherent radiation, which may be laser radiation, is incident upon beam splitter 102, which may be a partially reflecting mirror, and is broken up into first component beam 104 and second component beam 106. First component beam 104 is widened into parallel reference beam 108 by collimator 110, composed of lenses 112 and 114. Reference beam 108 impinges upon the photosensitive surface of a hologram plate 116. Second component beam 106, after being reflected from totally reflecting mirror 118 is widened by lens 120 and applied through diffuser 122, which may be a sheet of ground glass, for instance. The diffused light emerging from diffuser 122 is passed through an object in the form of photographic transparency 124, which has thereon the information to be recorded. The diffused light emerging from transparency 124 is information component 126. The directions of travel of information component 126 is such that at least a good portion thereof impinges upon the same area of hologram plate 116 as does reference beam 108 to thereby produce an interference pattern over this area, which is the hologram to be recorded.

As is shown in FIG. 1, reference beam 108 and information component 126 are essentially asymmetrical with respect to each other. Further, although one of parallel reference beam 108 and information component 126 (parallel reference beam 108 in the case shown) is symmetrical with respect to the surface of hologram plate 116, the other of reference beam 108 and information component 126 is asymmetrical with respect thereto. These asymmetries limit the resolution and make it difficult to optimize the fidelity of holograms produced with apparatus illustratively shown in FIG. 1.

Referring now to FIG. 2, there is shown a first embodiment of the present invention for recording an "annular" hologram. A beam of spatially coherent radiation, such as laser beam 200 is passed through collimator 202, composed of lens 204 and 206 to form an enlarged beam of parallel light, forming a plane wave of circular cross section, which is coaxial with laser beam 200 about axis 0—0' as shown. Reference beam attenuator 210, in the form of a circular annulus, is symmetrically disposed normal to axis 0—0' as shown, to be illuminated solely by the outer portion of parallel beam 208. Reference beam attenuator 210 is formed of a material having predetermined absorption characteristics for absorbing a certain fraction of the radiation impinging thereon and transmitting the rest therethrough, and may be an optically flat transparent plate on which a semitransparent metal film has been deposited. The plane wave radiation symmetrically disposed about axis 0—0' which passes through reference beam attenuator 210 constitutes reference beam 212.

Hologram plate 214 is symmetrically disposed normal to axis 0—0' and is axially displaced from reference beam attenuator 210 in the path of reference beam 212. Since reference beam 212 is a plane wave and hologram plate 214 is oriented parallel to reference beam attenuator 210, the active area of hologram plate 214 which is irradiated by reference beam 212 will be a circular annulus symmetrically disposed about axis 0—0' which is identical in size with the circular annulus forming reference beam attenuator 210, but which is axially displaced with respect thereto.

Inserted within and covering the area defined by the circle having the inner circumference of reference beam attenuator 210 is diffuser 216. Diffuser 216 is symmetrically disposed about axis 0—0'. Directly in front of diffuser 216, located between diffuser 216 and hologram plate 214, is object transparency 218. Object transparency 218 is also symmetrically disposed about axis 0—0'. Mechanically, a single frame, not shown, can be utilized to support reference beam attenuator 210, diffuser 216 and object transparency 218.

The light emerging from object transparency 218 will constitute an information component, indicated schematically by arrows 220, at least a portion of which will impinge upon the annular active area of hologram plate 214 which is irradiated by reference beam component 212. This will result in a hologram interference pattern being recorded over this annular active area of hologram plate 214. The purpose of reference beam attenuator 210 is to provide the optimum ratio between the intensities of the information component and the reference beam.

It will be seen that all the elements utilized to make an "annular" hologram have circular symmetry with respect to axis 0—0'. This lends simplicity to the construction of the equipment. Further, this circular symmetry means that the lenses utilized, such as lens 204 and lens 206 are subject to only one of the many types of aberrations to which lenses are usually subject, namely spherical aberration. Further, correction for spherical aberration need only be applied to an annular zone of the lens, rather than over the whole field. Most important, however, is the fact that the resolution obtained from an "annular" hologram is optimized. This is because the "annular" hologram allows the maximum possible solid angle of object transparency information carrying waves to interfere with the reference beam wave. This maximum solid angle is approached as the object size becomes small compared to the "annular" hologram active area and the object to hologram plate distance is reduced. The use of these large solid angles enables very high resolution to be obtained in the reconstructed image, with the limiting resolution being of the order of the wavelength of the radiation being utilized.

Referring now to FIG. 3, a recorded "annular" hologram of the type made by the apparatus shown in FIG. 2, is reconstructed by orienting the recorded hologram plate 300 so that it is circularly symmetrical axis 0—0 of FIG. 3, and irradiating the recorded plate 300 with a plane wave reconstruction beam 302, which is also circularly symmetrical about axis 0—0'. An opaque mask 304, which is also circularly symmetrical about axis 0—0' is placed in the path of reconstruction beam 304 to prevent plane wave reconstruction beam 302 from illuminating the central portion of hologram plate 300 and thereby permit plane wave reconstruction beam 302 to illuminate solely the annular active area 306 of hologram plate 300 on which the "annular" hologram has been recorded. This results in a real image 308 of the original object transparency being reproduced, as shown. Real image 308 of the original object transparency is also circularly symmetrical with respect to axis 0—0' of FIG. 3.

The embodiment of FIG. 4 for recording an "annular" hologram is a modification of the embodiment of FIG. 2, in which a beam splitter, rather than a reference beam attenuator, is utilized to provide the optimum ratio of intensity between the reference beam and the information component. More particularly, a beam of laser radiation 400 is split by beam splitter 402 into component beam 404 and component beam 406. The reflection and transmission characteristics of beam splitter 402, which may be a partially reflecting mirror, are such as to provide a predetermined ratio of the intensity of component beam 404 and 406 with respect to each other. Component beam 404, after being widened into reference beam 408 by a collimator composed of lenses 410 and 412, is directed to the surface of hologram plate 414. Component beam 406, after being reflected by mirrors 416 and 418 and then being widened by lens 420 and reflected by mirror 422, is passed through diffuser 424 and object transparency 426 to form information component 428. Mirror 422, diffuser 424 and object transparency 426 are located as shown to mask the central portion of hologram plate 414 from reference beam 408 and to permit interference between reference beam 408 and information component 428 to take place on the surface of hologram plate 414 solely over the annular active area 430. The predetermined ratio of intensities between component beams 404 and 406, discussed above, is such as to provide the optimum ratio of the interfering portions of reference beam 408 and information component 428 at the annular active area 430 of hologram plate 414.

Figure 5:
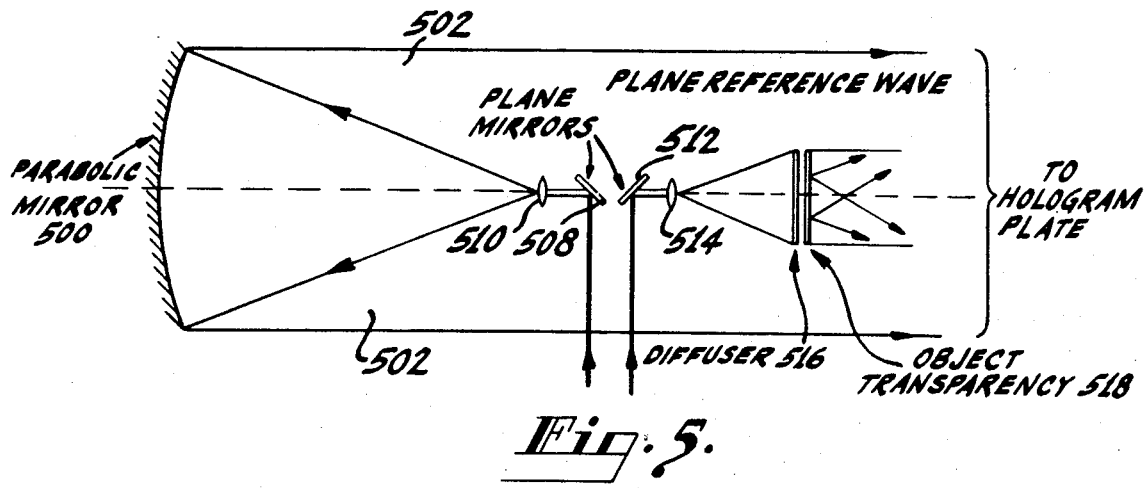
FIG. 5 is a fourth illustrative embodiment of the present invention, which is utilized in recording an "annular" hologram.

A further modification of the embodiment shown in FIG. 4 is illustrated in FIG. 5. In FIG. 5, the parabolic mirror 500 is utilized to generate the plane reference wave of reference beam 502. More particularly, two separate beams of coherent radiation 504 and 506 are introduced, as shown, from the side. Two parallel spaced beams of coherent radiation, such as beams 504 and 506, are obtainable from a single laser in a variety of ways. On way is to utilize the beam from one end of a laser for one of beams 504 and 506 and for utilizing prisms for reversing the beam from the other end of the laser to obtain the other one of beams 504 and 506. In any case, beam 504, after reflection by plane mirror 508 and widening by lens 510 is reflected by parabolic mirror 500 to form reference beam 502 having a plane reference wave. Beam 506, after reflection by mirror 512 and widening by lens 514 is passed through diffuser 516 and object transparency 518 to form information component 520. Information component 520 and reference beam 502 will interfere at an annular active area of the surface of a hologram plate, not shown, to form an "annular" hologram in the same manner as discussed above in connection with FIGS. 2 and 4.

Figure 6:
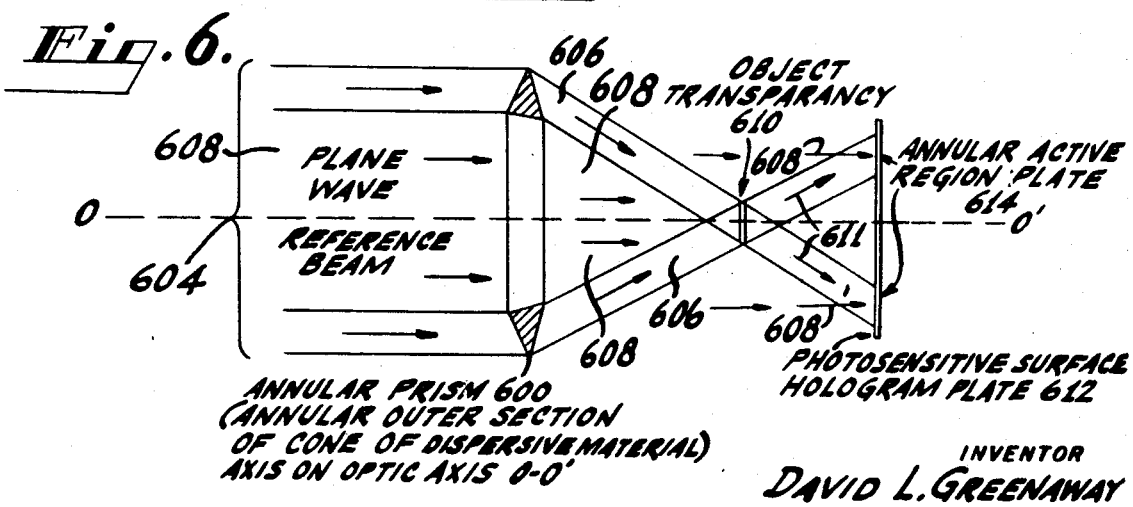
FIG. 6 is a fifth illustrative embodiment of the present invention, which shows first alternative structure for the diffuser shown in each of FIGS. 2, 4 and 5.
Figure 7:
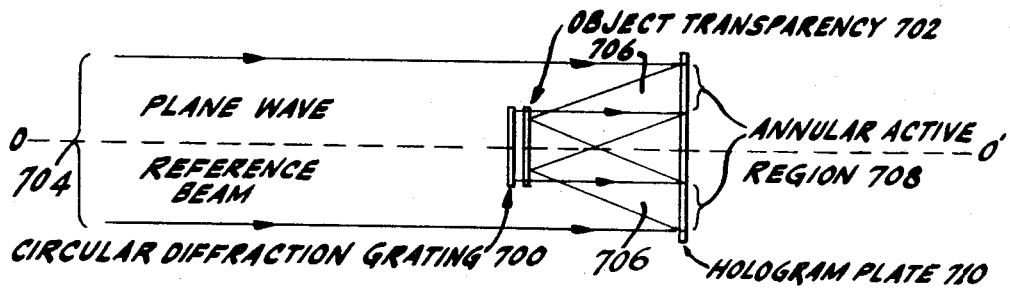
FIG. 7 is a sixth illustrative embodiment of the present invention which shows second alternative structure for the diffuser shown in each of FIGS. 2, 4 and 5.

The disposition of the elements discussed above in connection with the modifications of FIG. 4 and FIG. 5 is such as to provide the same type of circular symmetry between the reference beam and the information component, as well as among many of the elements themselves, as described above in connection with FIG. 2. In each of the embodiment of FIGS. 2, 4 and 5, the "annular" hologram has been produced by interference between an annular reference wave radiation which has been transmitted through an object transparency after being diffused by a diffuser, which is a scattering element. This diffuser does not constitute an essential requirement for the formation of "annular" holograms, although holograms so made have the property that they possess complete redundancy of the stored information; it is only necessary that some means be employed to provide an annular region of interference between the reference wave and the object transparency information-carrying wave. Two alternative methods by which this interference can be achieved are shown in the modifications of FIGS. 6 and 7, respectively. The methods shown in FIGS. 6 and 7, yield holograms which are partially redundant.

As shown in FIG. 6, an annular prism 600 is disposed of circular symmetry with respect to axis 0—0' of FIG. 6. Annular prism 600 is located in cooperative relationship with the outer portions 602 of plane wave reference beam 604. Only this outer portion 602 of plane wave reference beam 604 is bent by annular prism 600 into conical light beam 606. The central portion 608 of plane wave reference beam 604 remains a plane wave.

Located, as shown, at the apex of conical light beam 606 and circularly symmetrically disposed about axis 0—0' of FIG. 6 is object transparency 610. The diameter of object transparency 610 and the width of the annulus of annular prism 600 are related to each other such that object transparency 610 just fits into the apex portion of conical light beam 606, as shown. Emerging from object transparency 610 is conical information component 611. Symmetrically disposed about axis 0—0' of FIG. 6 in the path of information component 611 is hologram plate 612. Hologram plate 612 is spaced substantially closer to object transparency 610 than is annular prism 600 so that the annular region of hologram plate 614 intercepted by information component 611 has an outer diameter smaller than the inner diameter of annular prism 600. This permits light from the central portion 608 of plane wave reference beam 604 to also illuminate the surface of annular region of hologram plate 614, where it interferes with information component 611 to form an "annular" hologram.

In the modification of FIG. 7, the diffuser of FIGS. 2, 4 and 5 is replaced with circular diffraction grating 700, having equispaced and concentric rulings which is symmetrically disposed normal to axis 0—0' of FIG. 7. The central portion of plane wave reference beam 704, after being diffracted by circular diffraction grating 700, is passed through object transparency 702 to form information component 706. Information component 706 impinges upon annular region 708 of hologram plate 710, where it interferes with the outer portion of plane wave reference beam 704, which also impinges upon annular region 708 of hologram plate 710. Thereby, an "annular" hologram is recorded. More complex gratings, supplying increased redundancy, may also be utilized.

Figure 8:
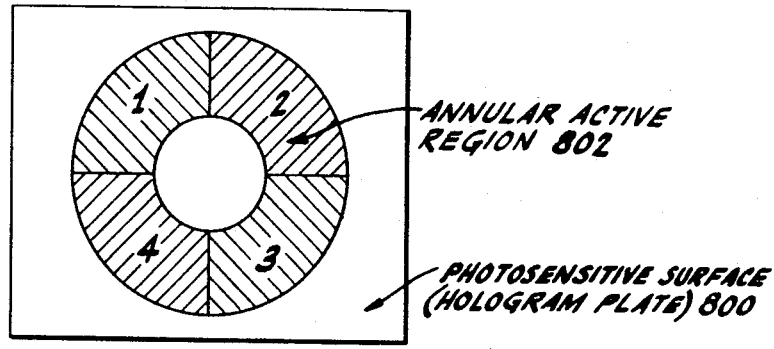
FIG. 8 shows the format of an "annular" hologram divided into a plurality of sectors.

Although up to the present it has been assumed that the entire annular active region of a hologram plate is utilized for recording a hologram of a single object transparency this need not be the case. It is possible to mask most of the annular active region of the hologram plate, leaving only a given sector thereof to be exposed by the interference pattern from a single object transparency. By successively exposing different sectors of the annular active region of the hologram plate, a plurality of different holograms can be recorded on a single annular active region of a hologram plate. An example of this is shown in FIG. 8, where the annular active region of a hologram plate 800 is shown divided into four sectors each covering a different 90° portion of annular active region 802 of hologram plate 800.

In the recording and reconstruction of all "annular" holograms described up to now, a plane wave reference beam and reconstruction beam have been utilized. However, this is not essential.

Figure 9:
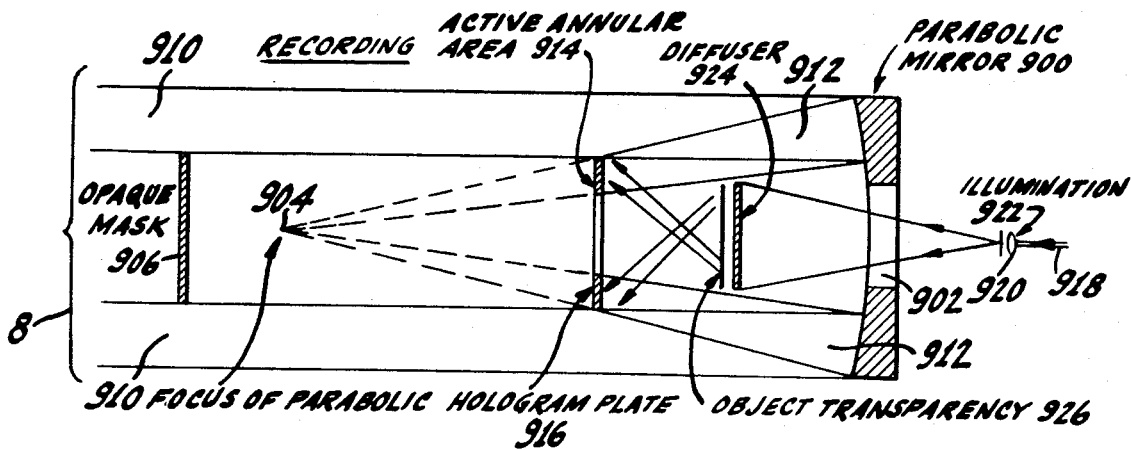
FIG. 9 is a seventh illustrative embodiment of the present invention, which utilizes a converging reference beam for recording an "annular" hologram.

Referring now to the embodiment shown in FIG. 9, there is shown a parabolic mirror 900 having a central aperture 902. Parabolic mirror 900 has a focus at point 904, located beyond focus 904, with respect to parabolic mirror 900, is opaque mask 906. A plane wave 908 is directed from the left toward parabolic mirror 900. However, the diameter of opaque mask 906 is such that only the outer portion 910 of plane wave 908 impinges upon parabolic mirror 900. This results in a converging reference beam 912 being reflected from parabolic mirror 900 and being directed to active annular area 914 of hologram plate 916, located as shown between parabolic mirror 900 and its focus 904. At the same time, light beam 918 which is coherent with plane wave 908 is widened by lens 920, having pinhole means 922 in front thereof, and applied through diffuser 924 and object transparency 926 to form information component 928, at least a portion of which impinges upon active annular area 914 of hologram plate 916 where it interferes with converging reference beam 912 to form an annular hologram thereon.

Figure 10:
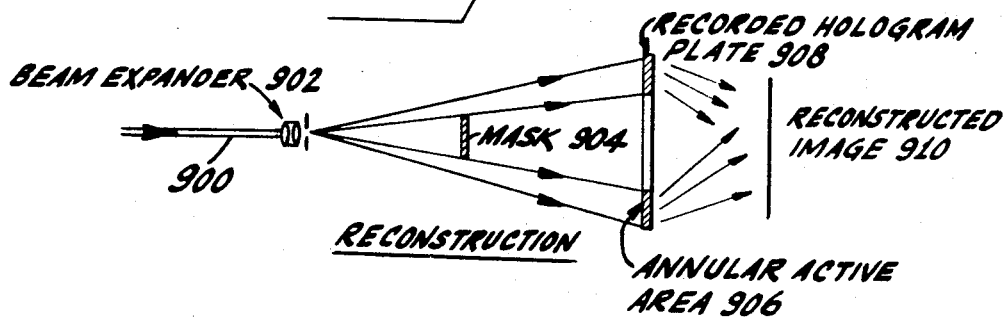
FIG. 10 is an eighth illustrative embodiment of the present invention, which shows the use of a diverging reconstruction beam for reconstructing a hologram made with the apparatus of FIG. 9.

FIG. 10 shows an arrangement for reconstructing a hologram produced by the apparatus of FIG. 9. More particularly, reconstruction light beam 900, after being expanded by beam expander 902, and having a central portion thereof masked by mask 904 illuminates annular active area 906 of recorder hologram plate 908. This will result in the generation of a reconstructed image 910.

In the arrangement shown in FIGS. 9 and 10, if it is desired that the reconstructed image be the same size as the original transparency, then it is necessary to insure that the distance between the "annular" surface and the focus of the converging reference wave utilized in recording is identical to the distance between the effective source of the diverging reconstruction wave after beam expansion and the "annular" hologram surface during reconstruction. Under these conditions, the distance between the "annular" hologram and image on reconstruction, will be identical to the distance that existed between the "annular" hologram and the object transparency on recording. It is assumed that the same wavelength radiation is used for both recording and reconstruction. If the distance between the effective source of the diverging reconstruction wave and the "annular" hologram surface on reconstruction is changed, then the resultant image changes its position, and it is either enlarged or reduced in size, by an amount which is calculable from the elementary theory of optics. Enlargement or reduction in size and a shift of image position also takes place if the wavelength of the radiation is changed for the image reconstruction process.

The main advantages of utilizing a converging reference beam for a recording and a diverging reconstruction beam for image retrieval are: (1) that the reconstruction optical system can be made simpler and more compact; the requisite wavefront being obtained using a point source of illumination such as a beam-expanding objective and pinhole suitably positioned in a laser beam, and (2) the possibility exists for changing the size of the reconstructed image in a simple manner.

Although for illustrative purposes, "annular" holograms at light wavelengths have been described herein, interference patterns analogous to light holograms can be made with other wave energy, such as electromagnetic energy outside of the light spectrum and acoustic energy for instance. This invention contemplates such analogous "annular" interference patterns, as well as "annular" light holograms.

In the foregoing description the active area of the hologram takes the form of a circular annulus or a sector thereof. In a practical application of the annular hologram technique, and in particular where a diffuser is employed to provide the object illuminating beam, the geometry of the hologram plate and the object transparency dictate that the active area of the hologram may conveniently be square or rectangular, with a square or rectangular inactive region at the center. These variations, which still nevertheless possess axial symmetry, are clearly included in the spirit of this invention, and is meant to be covered by the terms "annular" as used in the claims.

What is claimed is:

1. Apparatus for recording a hologram comprising a wave-energy sensitive hologram plate disposed normal to a given axis, an object axially displaced from said plate and wholly confined within an interior region which is circularly symmetrical with respect to said given axis and which has a given maximum diameter, first means responsive to a first portion of coherent wave-energy applied thereto for exposing at least a sector of an annular region of the surface of said hologram plate which annular region has a minimum diameter at least equal to said given maximum diameter with an information component of coherent wave-energy which has been spatially modulated by said object in response to illumination thereof by said first portion, and second means responsive to a second portion of said coherent wave-energy applied thereto for simultaneously exposing at least said sector of said annular region with an annular reference beam component of coherent wave-energy from said second portion which is confined to an annular exterior region which is circularly symmetrical with respect to said given axis and which is distinct from but surrounds said interior region, whereby a hologram is formed by the interference between said information component and said reference beam component which is confined to said annular region of the surface of said hologram plate, wherein said object is a transparency lying in a plane normal to said given axis with said transparency being symmetrically disposed about said given axis, (The apparatus defined in claim 6, further including) and wherein said first means includes a circular diffraction grating symmetrically disposed with respect to said given axis and located in cooperative relationship with said transparency for diffracting said coherent light with which said transparency is illuminated.

2. Apparatus for recording a hologram comprising a wave-energy sensitive hologram plate disposed normal to a given axis, an object axially displaced from said plate and wholly confined within an interior region which is circularly symmetrical with respect to said given axis and which has a given maximum diameter, first means responsive to a first portion of coherent wave energy applied thereto for exposing at least a sector of an annular region of the surface of said hologram plate which annular region has a minimum diameter at least equal to said given maximum diameter with an information component of coherent wave-energy which has been spatially modulated by said object in response to illumination thereof by said first portion, and second means responsive to a second portion of said coherent wave energy applied thereto for simultaneously exposing at least said sector of said annular region with an annular reference beam component of coherent wave-energy from said second portion which is confined to an annular exterior region which is circularly symmetrical with respect to said given axis and which is distinct from but surrounds said interior region, whereby a hologram is formed by the interference between said information component and said reference beam component which is confined to said annular region of the surface of said hologram plate, wherein said object is a transparency lying in a plane normal to said given axis with said transparency being symmetrically disposed about said given axis, (The apparatus defined in claim 6,) further including an annular prism having an internal diameter greater than the external diameter of said annular region on said hologram plate, said prism being symmetrically disposed with respect to said given axis in normal relationship therewith, said prism being axially spaced from said transparency on the other side thereof from said hologram plate by a given distance, the refraction provided by said prism and said given distance being such that a beam of coherent light passing through said prism is directed through said transparency and then impinges solely on said annular region of said hologram plate.

3. Apparatus for recording a hologram comprising a wave-energy sensitive hologram plate disposed normal to a given axis, an object axially displaced from said plate and wholly confined within an interior region which is circularly symmetrical with respect to said given axis and which has a given maximum diameter, first means responsive to a first portion of coherent wave-energy applied thereto for exposing at least a sector of an annular region of the surface of said hologram plate which annular region has a minimum diameter at least equal to said given maximum diameter with an information component of coherent wave-energy which has been spatially modulated by said object in response to illumination thereof by said first portion, and second means responsive to a second portion of said coherent wave-energy applied thereto for simultaneously exposing at least said sector of said annular region with an annular reference beam component of coherent wave-energy from said second portion which is confined to an annular exterior region which is circularly symmetrical with respect to said given axis and which is distinct from but surrounds said interior region, whereby a hologram is formed by the interference between said information component and said reference beam component which is confined to said annular region of the surface of said hologram plate, wherein said second means includes means for supplying a converging wave annular reference beam component having a predetermined degree of convergence.

4. Apparatus for recording a hologram comprising a wave-energy sensitive hologram plate disposed normal to a given axis, an object axially displaced from said plate and wholly confined within an interior region which is circularly symmetrical with respect to said given axis and which has a given maximum diameter, first means responsive to a first portion of coherent wave-energy applied thereto for exposing at least a sector of an annular region of the surface of said hologram plate which annular region has a minimum diameter at least equal to said given maximum diameter with an information component of coherent wave-energy which has been spatially modulated by said object in response to illumination thereof by said first portion, and second means responsive to a second portion of said coherent wave energy applied thereto for simultaneously exposing at least said sector of said annular region with an annular reference beam component of coherent wave-energy from said second portion which is confined to an annular exterior region which is circularly symmetrical with respect to said given axis and which is distinct from but surrounds said interior region, whereby a hologram is formed by the interference between said information component and said reference beam component which is confined to said annular region of the surface of said hologram plate, wherein said second means includes means for supplying a plane wave annular reference beam component, wherein said second means includes beam-enlarging collimating means symmetrically disposed about said given axis and responsive to a narrow axial beam of coherent light for producing an axial output beam of plane wave light having a diameter equal to the external diameter of said annular region, and means including said object for preventing a central portion of said output beam having said given maximum diameter from contributing to said annular reference beam component, further including beam-splitting means in the path of said narrow axial beam for splitting said narrow beam into an axial first component having a first intensity which is applied to said beam-enlarging collimating means and a nonaxial second component having a second intensity having a predetermined ratio with respect to the intensity of said first component, and means for illuminating said object with second component.

UNITED STATES PATENT OFFICE
CERTIFICATE OF CORRECTION

Patent No. 3,602,570          Dated August 31, 1971

Inventor(s) David L. Greenaway

It is certified that error appears in the above-identified patent and that said Letters Patent are hereby corrected as shown below:

Column 7, lines 30 & 31      after "axis," delete -- (The apparatus defined in claim 6, further including) --

Column 7, lines 61 & 62      after "axis," delete -- (The apparatus defined in claim 6,) --

Signed and sealed this 18th day of January 1972.

(SEAL)
Attest:

EDWARD M. FLETCHER, JR.    ROBERT GOTTSCHALK
Attesting Officer            Acting Commissioner of Patents